(12) United States Patent
Reetz et al.

(10) Patent No.: US 7,244,688 B2
(45) Date of Patent: Jul. 17, 2007

(54) METHOD FOR IN SITU IMMOBILIZATION OF WATER-SOLUBLE NANODISPERSED METAL OXIDE COLLOIDS

(75) Inventors: Manfred T. Reetz, Mülheim an der Ruhr (DE); Marco Lopez, Frankfurt am Main (DE)

(73) Assignee: Studiengesellschaft Kohle mbH, Mulheim an der Ruhr (DE)

( * ) Notice: Subject to any disclaimer, the term of this patent is extended or adjusted under 35 U.S.C. 154(b) by 73 days.

(21) Appl. No.: 10/507,764

(22) PCT Filed: Feb. 25, 2003

(86) PCT No.: PCT/EP03/01826

§ 371 (c)(1),
(2), (4) Date: Sep. 15, 2004

(87) PCT Pub. No.: WO03/078056

PCT Pub. Date: Sep. 25, 2003

(65) Prior Publication Data

US 2005/0148464 A1 Jul. 7, 2005

(30) Foreign Application Priority Data

Mar. 16, 2002 (DE) .................. 102 11 701

(51) Int. Cl.
*B01J 21/18* (2006.01)
*B01J 23/00* (2006.01)
(52) U.S. Cl. .................. 502/182; 502/180; 502/305
(58) Field of Classification Search .............. 502/180, 502/305–355
See application file for complete search history.

(56) References Cited

U.S. PATENT DOCUMENTS

| 2,739,944 | A | * | 3/1956 | Kearby ................ 502/334 |
| 3,087,234 | A | * | 4/1963 | Alexander et al. ......... 75/232 |
| 3,127,356 | A | * | 3/1964 | Hamilton et al. ......... 502/185 |
| 4,044,193 | A | * | 8/1977 | Petrow et al. ............. 429/40 |
| 4,948,707 | A | * | 8/1990 | Johnson et al. ........... 430/311 |

(Continued)

FOREIGN PATENT DOCUMENTS

EP 0 880 188 11/1998

(Continued)

OTHER PUBLICATIONS

U.A. Paulus et al.; "New PtRu Alloy Colloids as Precursors for Fuel Cell Catalysts"; Journal of Catalysis; 2000; 383-393; 195; Academic Press.

(Continued)

*Primary Examiner*—J. A. Lorengo
*Assistant Examiner*—Patricia L. Hailey
(74) *Attorney, Agent, or Firm*—Norris, McLaughlin & Marcus PA

(57) ABSTRACT

The invention relates to heterogeneous catalysts which are particularly easy to produce. Said heterogeneous catalysts are generated by immobilizing preformed monometallic or multimetallic metal oxide particles in situ on an oxidic or non-oxidic carrier, wherefore metal oxide colloids which are stabilized by hydroxide ions and immobilized on carriers contained in the suspension are generated from conventional, water-soluble metal salts by means of hydrolysis and condensation. The inventive method makes it possible to produce fuel cell catalysts, for example.

24 Claims, 1 Drawing Sheet

Transmission electron micrograph of the PtRuOx colloid stabilized with hydroxide ions (left) and the supported PtRuOx catalyst subsequently obtained therefrom (right).

U.S. PATENT DOCUMENTS

| | | | | |
|---|---|---|---|---|
| 5,147,841 | A * | 9/1992 | Wilcoxon | 502/173 |
| 5,620,584 | A * | 4/1997 | Reetz et al. | 205/334 |
| 5,641,723 | A * | 6/1997 | Bonnemann et al. | 502/326 |
| 5,900,386 | A * | 5/1999 | Freund et al. | 502/330 |
| 5,925,463 | A * | 7/1999 | Reetz et al. | 428/402 |
| 5,939,220 | A * | 8/1999 | Gunner et al. | 429/40 |
| 6,090,746 | A * | 7/2000 | Bonnemann et al. | 502/325 |
| 6,165,636 | A * | 12/2000 | Giallombardo et al. | 429/44 |
| 6,224,739 | B1 * | 5/2001 | Reetz et al. | 205/464 |
| 6,325,910 | B1 * | 12/2001 | Meyer et al. | 205/159 |
| 6,326,098 | B1 * | 12/2001 | Itoh et al. | 429/40 |
| 6,686,308 | B2 * | 2/2004 | Mao et al. | 502/180 |
| 6,689,505 | B1 * | 2/2004 | Albers et al. | 429/44 |
| 6,706,795 | B1 * | 3/2004 | Garti et al. | 524/431 |

FOREIGN PATENT DOCUMENTS

| | | |
|---|---|---|
| EP | 1 036 784 | 9/2000 |
| EP | 1 079 452 | 2/2001 |
| FR | 2309045 | 11/1976 |
| JP | 59-075560 * | 4/1984 |
| JP | 01227361 | 9/1989 |
| JP | 01-266848 * | 10/1989 |
| JP | 63-203546 * | 2/1990 |
| JP | 03-022361 * | 1/1991 |
| JP | 2001093531 A | 4/2001 |
| JP | 2001118582 | 4/2001 |
| JP | 2003-089523 * | 3/2003 |

OTHER PUBLICATIONS

Michikazu Hara, et al.; "Photocatalytic Water Oxidation in a Buffered Tris (2,2'-bipyridyl) ruthenium Complex-Colloidal $IrO_2$ System"; Journal of Physical Chemistry; 2000; 5275-5280; 104; American Chemical Society.

Michikazu Hara et al.; "Photocatalytic Water Oxidation by Nafion-Stabilized-Iridium Oxide Colloids"; Chem. Commum.; 2000; 1903-1904; The Royal Scoiety of Chemistry.

K. Siepen et al.; "EXAFS/XANES, Chemisorption and IR Investigations of Colloidal Pt/Rh Bimetallic Catalysts"; Applied Organometallic Chemistry; 2000; 549-556; 14; John Wiley & Sons, Ltd.

M.T. Reetz et al.; "Water-Soluble Colloidal Adams Catalyst: Preparation and Use in Catalysis"; Journal of American Chemical Society; 1999; 7933-7934; 121; American Chemical Society.

M. Che, et al.; "Handbook of Heterogeneous Catalysis"; vol. 1; VCH; Weinheim; 1997; Germany (this publication is a book, attached is a copy of the cover pages).

H. Bönnemann, et al.; "Nanoscale Colloidal Metals and Alloys Stabilized by Solvents and Surfactants Preparation and Use as Catalyst Precursors"; Journal of Organometallic Chemistry; 1996; 143-162; 520.

A.B. Stiles, et al.; "Catalyst Manufacture: Laboratory and Commercial Preparation"; 1995; Marcel Dekker, Inc.; New York and Basel (this publication is a book, attached is a copy of the cover pages).

M.T. Reetz, et al.; "A New Strategy in Heterogeneous Catalysis: The Design of Cortex Catalysis"; Angew. Chem. Int. Ed. Engl.; 1995; 2728-2730; 34 No. 23/24; VCH, Germany.

H. Bönnemann, et al.; "Preparation, Characterization, and Application of Fine Metal Particles and Metal Colloids Using Hydrotriorganoborates"; Journal of Molecular Catalysis; 1994; 129-177; 86; Elsevier Science B.V., Amsterdam.

G. Schmid; "Clusters and Colloids"; 1994; VCh, Weinheim, Germany (this publication is a book, attached is a copy of the cover pages).

M. Watanabe, et al.; "Preparation of Highly Dispersed Pt+Ru Alloy Clusters and the Activity for the Electrooxidation of Methanol"; J. Electroanal. Chem.; 1987; 395-406; 229; Elsevier Sequoia S.A.

A. Harriman, et al.; "Catalytic and Structural Properties of Iridium-Iridium Dioxide Colloids"; New J. Chem.; 1987; 757-762; vol. 11 No. 11/12; CNRS-Gauthier-Villars.

C. Lume-Pereira, et al.; "Chemistry of Colloidal Manganese Dioxide. 1. Mehansim of Reduction of an Organic Radical (A Radiation Chemical Study)"; J. Phys. Chem.; 1985; 5772-5778; 89; American Chemical Society.

P.A. Christensen, et al.; "A Pulse-Radiolytic and Photochemical Study of the Oxidation of Water by Zinc Porphyrin π-Radical Cations"; J. Chem. Soc., Faraday Trans.; 1984; 1451-1464; 80.

K. Kalyanasundaram, et al.; "Cyclic Cleavage of Water into $H_2$ and $O_2$ by Visible Light with Coupled Redox Catalysts"; Angew. Chem. Int. Ed. Engl.; 1979; 701-702; 18 No. 9; Verlag Chemie, GmbH, Germany.

International Preliminary Examination Report for Application No. PCT/EP2003/001826 dated May 21, 2004.

International Search Report prepared by the European Patent Office for Application No. PCT/EP03/01826 dated Jul. 21, 2003.

* cited by examiner

Figure 1: Transmission electron micrograph of the PtRuOx colloid stabilized with hydroxide ions (left) and the supported PtRuOx catalyst subsequently obtained therefrom (right).

METHOD FOR IN SITU IMMOBILIZATION OF WATER-SOLUBLE NANODISPERSED METAL OXIDE COLLOIDS

This application is a 371 of PCT/EP03/01826 filed on Feb. 25, 2003.

The present invention relates to heterogeneous catalysts which are particularly simple to prepare and are produced by in-situ immobilization of preformed monometallic or multimetallic metal oxide particles on an oxidic or nonoxidic support.

Nanosize transition metal colloids are of great interest in catalysis. Applications are found, for example, in organic synthesis and as electrocatalysts for fuel cells. Furthermore, they serve as building blocks in materials science [G. Schmid, *Clusters and Colloids*, VCH, Weinheim, 1994]. Numerous methods are available for preparing metal colloids. Apart from physical methods such as metal vaporization or photochemical or radiolytic reduction of suitable metal precursors, metal colloids are obtained mainly by reduction of customary metal salts such as $PdCl_2$, $Pd(OAc)_2$, $H_2IrCl_6$, $H_2PtCl_6$, $PtCl_4$, $RuCl_3$, $CoCl_2$, $NiCl_2$, $FeCl_2$ or $AuCl_3$, dissolved in water or organic solvents by means of a wide range of chemical reducing agents such as complex hydrides or lower alcohols. Apart from monometallic metal colloids, bimetallic colloids are also obtainable by means of reductive methods, but the metals used have to have a similar redox potential because otherwise bimetallic colloids are not formed. The development of electrochemical processes for preparing metal and bimetal colloids enables the use of chemical reducing agents to be dispensed with. Variation of the electrolysis parameters allows the size of the metal colloids to be influenced in a targeted way [M. T. Reetz, S. A. Quaiser, *Angew. Chem.* 1995, 107, 2956; *Angew. Chem., Int. Ed. Engl.* 1995, 34, 2728]. Finally, the metal oxide concept developed by Reetz et al. allows surfactant- and polymer-stabilized metal oxide colloids to be prepared by means of simple basic hydrolysis of water-soluble metal salts [M. T. Reetz, M. G. Koch, *J. Am. Chem. Soc*, 1999, 121, 7933; DE 198525478 A]. From the point of view of industrial relevance, a method which makes it possible for nanosize metal particles to be prepared in water as solvent and without costly reducing agents has thus been developed. A further advantage of the metal oxide concept is the large number of accessible mixed metal systems which cannot be prepared by means of reductive methods.

Compared to metallic colloids, comparatively little about the preparation and properties of nanosize metal oxides is known from the literature. Apart from the above-mentioned water-soluble metal oxide colloids [M. T. Reetz, M. G. Koch, *J. Am. Chem. Soc*, 1999, 121, 7933; DE 198525478 A], the preparation of $MnO_2$ by radiolysis of $KMnO_4$ has been described [C. Lume-Pereira, et al., *J. Phys. Chem.* 1985, 89, 5772]. Furthermore, polymer-stabilized $RuO_2$ colloids prepared from $RuO_4$ or $KRuO_4$ are known [K. Kalyanasundaram, M. Grätzel, *Angew. Chem.* 1979, 91, 759; P. A. Christensen, et al., *J. Chem. Soc., Faraday Trans.* 1984, 80, 1451]. $IrO_2$ colloids are prepared by hydrolysis of $H_2IrCl_6$ in the presence of a stabilizing polymer [A. Harriman, et al., *New J. Chem.* 1987, 11, 757; M. Hara, C. C. Waraksa, J. T. Lean, B. A. Lewis, T. E. Mallouk, *J. Phys. Chem. A* 2000, 104, 5275; M. Hara, T. E. Mallouk, *Chem. Commun.* 2000, 1903].

Catalyst systems comprising more than one active component are frequently superior in terms of performance to the corresponding monometallic systems. Increasing attention is therefore also being paid to the targeted preparation of bimetallic and multimetallic systems in colloid chemistry. For example, mixed palladium-nickel colloids prepared by reduction using glycol and having a molar Pd/Ni ratio of 4/1 displayed the highest activity in the reduction of various nitroaromatics [P. Lu; N. Toshima *Bull. Chem. Soc. Jpn.*, 2000, 73, 751-758]. The same effect is observed in the case of mixed platinum-rhodium colloids [K. Siepen, H. Bönnemann, W. Brijoux, J. Rothe, J. Hormes, *J. Appl. Organom. Chem.*, 2000, 14, 549-556]. In this case, too, the mixed colloids (Pt/Rh=1/9) displayed the highest activity in the reduction of butyronitrile.

The positive influence of immobilization of the metal colloids is made clear, for example, by metal colloids immobilized on carbon black or $SiO_2$. In the hydrogenation of 1,5-cyclooctadiene, butyronitrile, cyclohexene and crotonic acid, the heterogenized colloid catalysts display a higher activity than corresponding commercial heterogeneous catalysts [a) H. Bönnemann, G. Braun, W. Brijoux, R. Brinkmann, A. Schulze-Tilling, K. Seevogel, K. Siepen, *J. Organomet. Chem.* 1996, 520, 143-162; b) H. Bönnemann, W. Brijoux, R. Brinkmann, R. Fretzen, T. Joußen, R. Köppler, B. Korall, P. Neiteler, J. Richter, *J. Mol. Catal.* 1994, 86, 129-177].

Surfactant-stabilized platinum-ruthenium colloids have also been prepared for use as polymer electrolyte membrane fuel cell (PEM-FC) catalysts [U. A. Paulus, U. Endruschat, G. J. Feldmeyer, T. J. Schmidt, H. Bönnemann, R. J. Behm, *J. of Catalysis*, 2000, 195, 383]. For this purpose, platinum acetylacetonate and ruthenium acetylacetonate were reduced by means of trimethylaluminum in dry toluene under argon. The colloids were made water-insoluble by addition of nonionic polyoxyethylenealkyl surfactants and, in a third step, immobilized on Vulcan XC72. However, the need to work under inert gas and the many steps necessary in this process are disadvantageous. In addition, it has to be assumed that aluminum continues to be present in the catalyst material, which sometimes has an adverse effect on the actual catalysis.

In the cases described, the stabilizer is only a necessary auxiliary reagent. It would therefore be desirable, from ecological and economic points of view, to be able to dispense with the stabilizer entirely in the preparation of heterogeneous catalysts prepared from preformed metal colloids.

An alternative approach to the preparation of heterogeneous catalysts is provided by the known methods which are used, in particular, in industry, e.g. absorption, precipitation and ion exchange of metal ions on support materials. Here, the active component is generated in a plurality of stages by reduction, pyrolysis, calcination, etc., only after application of the respective metal ions to the support [a) A. B. Stiles, T. A. Koch, *Catalyst Manufacture*, Marcel Dekker, New York, 1995; b) M. Che, O. Clause, C. Marcilly in *Handbook of Heterogeneous Catalysis*, vol. 1, (ed.: G. Ertl, H. Knözinger, J. Weitkamp), VCH, Weinheim, 1997].

To prepare the commercial platinum-ruthenium/Vulcan XC72 catalysts for low-temperature fuel cells, use is made mainly of a process developed by Watanabe. Here, platinum sulfite complexes are oxidatively decomposed and a ruthenium salt is simultaneously absorbed. A disadvantage is that the synthesis requires strict adherence to particular pH values. Only in the last stage are the 3-4 nm platinum-ruthenium particles generated by reduction with hydrogen [M. Watanabe, M. Uchida, S. Motoo, *J. Electroanal. Chem.* 1987, 229, 395].

A further example is provided by fuel cell catalysts comprising up to four metals from the group consisting of Pt, Rh, Ru, Pd, Ir. However, the multimetallic catalysts are prepared via complicated two-stage absorption and reduction process [S. Hitomi JP 2001118582 A2, and DE 10047935 A1].

The use of platinum colloids as precursors for the active component of a fuel cell catalyst has also been described [Petrow et al. FR 2309045 A2, and U.S. Pat. No. 4,044,193 A]. Here, $H_6Pt(SO_3)_4$, a platinum salt which is obtained beforehand as a white solid from $H_2PtCl_6$ by ligand exchange and subsequent treatment with an ion exchanger is used as a source of platinum colloids. Disadvantages of this process are the use of the $H_6Pt(SO_3)_4$ salt which firstly has to be prepared by a complicated method, the high costs to be expected from the use of numerous chemicals [ion exchange resin, sodium carbonate, sodium sulfite) and the multistage process which finally leads to a finished catalyst. In addition, only a catalyst comprising platinum as active component is obtainable by means of this process.

The use of citrate as reducing agent for preparing platinum colloids as precursors for a fuel cell catalyst has also been described [Y. Suguru, S. Terazono, E. Yanagsawa, JP 2001093531 A2]. The platinum colloids stabilized by means of dodecylbenzenesulfonate after reduction are deposited on Vulcan XC72R conductive carbon black which has been activated beforehand by treatment with 60% strength nitric acid. A disadvantage of this process is the necessity of using a stabilizer and a reducing agent. In addition, the active component is deposited on the still to be activated support only in a second step.

A comparatively quick route to a finished catalyst layer for a polymer membrane electrolyte fuel cell (PEM-FC) is provided by an alternative process [Hitomi, JP 200111858 A]. Here, a spreadable paste is firstly produced from Vulcan XC72 and the Nafion polymer. This is used to prepare a 13 μm thick film into which $[Pt(NH_3)_4]Cl_2$ is introduced by adsorption over a period of 24 hours. This composite is finally treated with hydrogen at 180° C. in order to reduce the platinum and to generate the active particles on the support. This process is carried out twice and excess [Pt (NH_3)_4]Cl_2 is washed out of the film using 1 M hydrochloric acid. Disadvantages of this process are, in this case too, the necessarily multistage process with intermediate drying steps and the reduction process occurring at 180° C.

The abovementioned examples of the preparation of heterogeneous catalysts show the general disadvantages which have not yet been solved:
1) If colloids are used as preformed active components, it is necessary to use temporary stabilizers to prevent undesirable agglomeration. The subsequent removal of the stabilizer is complicated and not always quantitative. In addition, the amounts of the substances which can be obtained are still too low for industrial applications.
2) Catalysts produced in the classical way frequently require a large number of complicated process steps. Furthermore, the active component in its final form is obtained only after the last process step.

It is therefore an object of the invention to avoid these disadvantages.

An unexpected simple way of avoiding these disadvantages is the in-situ immobilization according to the invention of metal oxide colloids formed by basic hydrolysis on an oxidic or nonoxidic support. Here, in contrast to the known methods of preparing metal or metal oxide colloids, the use of a stabilizer is dispensed with. In this way, a heterogeneous catalyst which comprises, as active component, metal oxide particles comprising one, two or more different, homogeneously mixed metal oxides is obtained in a single process step after appropriate purification and drying. The particles have an average diameter of 0.5-5 nm, usually 1-3 nm, and are uniformly distributed over the support. This observation is all the more surprising since it was not to be assumed that it would be possible to immobilize colloids stabilized by negatively charged hydroxide ions in a basic solution on a support.

This process makes it possible to obtain, inter alia, supported multimetal oxide catalysts comprising oxides of at least three different metals among which one can be a main group metal, in particular Sn, and also catalysts comprising the oxides of two metals of which one metal can be Pt and the second can be Sn or Ir, Ru, Fe or W or another transition metal or one metal is Ir and the second metal is another transition metal. The catalysts which can be obtained by the inventive process include the combinations comprising at least three transition metals which are of interest for fuel cell applications and in which the oxides of Pt and Ir are in each case present, and the arbitrary combinations of at least three oxides of metals selected from the group consisting of Pt, Ir, Ru, Os, W, Mo, Pd and Sn, e.g. the combinations Pt/Ru/Mo, Pt/Ru/Os, Pt/Ru/Sn, Pt/Ru/Os/Ir.

Suitable transition metals are the metals of transition groups IIIb, IVb, Vb, VIIb, VIIb, VIII, Ib or IIb of the PTE.

Conversion of the metal oxides into the appropriate reduced form of the metals on the support can be effected either during the later catalysis process or beforehand by treatment with, for example, hydrogen, hypophosphite, formate or alcohols (e.g. methanol, ethanol, etc.), with-out appreciable particle growth or alteration of the stoichiometry being observed. When electrically conductive carbon blacks are used as supports, reduction of the metal oxide particles by electrochemical means is also possible. A further advantage of the method is the insensitivity of the catalyst toward atmospheric oxygen when carbon is used as support. In contrast to, for example, platinum(0) on Vulcan XC72, no spontaneous combustion of the support is observed since the metal is present in immobilized form as metal oxide.

That the process is actually an in-situ immobilization following the synthesis of the metal oxide colloids is evidenced by a clear solution without a precipitate being obtained after an appropriately short reaction time in the absence of a suitable support and a transmission electron micrograph of the solution showing metal oxide particles having a size of 1-2 nm. This corresponds to the size found for the active component on the support material in a transmission electron micrograph. At an excessively long reaction time, undesirable agglomeration and precipitation of the metal oxide is observed in the absence of a support material.

This novel process (also referred to by us as "instant process") thus differs from known processes in which dissolved metal salts are firstly applied to a support by impregnation, precipitation or ion exchange and the active component is only generated in its final form and size on the supports in one or more subsequent steps. The novel process is also particularly simple.

The novel method of in-situ immobilization of colloidal metal oxides has, inter alia, the following advantages:
1) The use of water as inexpensive and environmentally friendly solvent.

2) Virtually complete conversion of the metal precursor into soluble metal or multimetal oxides (no loss of metal).
3) Up to 20% of metal is immobilized on the support in only one reaction step.
4) Preparation of virtually monodisperse, dissolved or supported nanoparticles in the size range 0.5-5 nm, i.e. high dispersion of the metals.
5) The metal or multimetal oxide particles obtained by hydrolysis and condensation display a high structural stability at high temperatures. For example, no appreciable particle growth was observed for platinum-ruthenium-osmium-iridium oxide particles having an average size of 2 nm after treatment at 500° C. in an XRD/DFA experiment.
6) Concentration in space of the particles of the support surface is not observed; instead, a uniform distribution of the active component on the support is found.
7) Multiple treatment of the already metal-laden support with fresh metal salt solution makes it possible to achieve even higher loadings with retention of the average particle size and distribution on the support.
8) Simple purification and isolation of the catalyst powder by dialysis, lyophilization or centrifugation.
9) Simple reduction of the supported metal or multimetal oxides by means of hypophosphite, formate, hydrogen or alcohols (e.g. methanol, ethanol, etc.) without an appreciable change in the stoichiometry and the size distribution. In the case of particles supported on electrically conductive carbon blacks, the catalyst can also be reduced by electrochemical means.
10) Problem-free handling of the supported metal oxide or multimetal oxide catalysts in air, in contrast to the corresponding supported metal catalysts which are subject to surface oxidation in air and sometimes tend to ignite spontaneously.
11) Immobilization of the active component on a support in only one reaction step, without further work-up or activation steps.
12) Control of the stoichiometry of the bimetals over a wide range.

According to the invention, the aqueous solution or suspension of a transition metal salt, or a mixture of two or more metal salts $M_mX_n$, is added to the aqueous solution of a base and a suitable support. The basic suspension of the metal salts and the support is intimately mixed by stirring at elevated temperature until the metal oxide colloids are completely immobilized. This leads firstly to hydrolysis of the metal salts and to condensation or cocondensation to form colloidal monometal oxides or colloidal mixed metal oxides which are temporarily stabilized electrostatically by means of hydroxide ions present.

$$M_1X_n + M_2X_n + M_3X_n + M_4X_n + \ldots + H_2O + \text{base} \rightarrow [M_1M_2M_3M_4O_y][OH^-]$$

The colloidal particles are gradually immobilized on the support from the solution during the reaction, without undesirable agglomeration or size growth of the particles occurring.

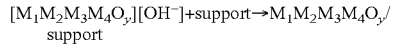

$$[M_1M_2M_3M_4O_y][OH^-] + \text{support} \rightarrow M_1M_2M_3M_4O_y/\text{support}$$

Possible precursors for preparing monometal and multimetal oxides are customary salts of the metals of transition groups IIIb, IVb, Vb, VIIb, VIIb, VIII, Ib and IIb of the Periodic Table; the same can be achieved using one or more of these salts in combination with the salt of a metal from the main groups of the Periodic Table, in particular salts of tin.

Bases used are carbonates, hydrogencarbonates, hydroxides, phosphates or hydrogenphosphates of the alkali metals and alkaline earth metals, e.g. LiOH, NaOH, KOH, $LiHCO_3$, $NaHCO_3$, $KHCO_3$, $CsHCO_3$, $Li_2CO_3$, $Na_2CO_3$, $K_2CO_3$, $Cs_2CO_3$, $Mg(OH)_2$, $MgCO_3$, $CaCO_3$, $Li_3PO_4$, $Na_2HPO_4$, $Na_3PO_4$ or $K_3PO_4$. Preference is given to using $Li_2CO_3$, $Na_2CO_3$, $K_2CO_3$, $CsCO_3$ or $MgCO_3$.

The reaction temperature used for the reaction is in the range from 20 to 100° C., preferably from 50° C. to 90° C.

The particle size of the nanostructured metal oxide colloids is in the range from 0.5 nm to 5 nm, preferably from 1 to 3 nm. The stoichiometric composition of the desired bimetal oxide and multimetal oxide colloids can be controlled in a simple fashion via the amounts of metal salts employed to start with.

The colloidal metal oxides obtained and the corresponding catalysts can be characterized by means of numerous physical methods including TEM, HRTEM/EDX, SEM/EDX, XRD/DFA, XPS, UV spectroscopy and cyclovoltammetry in the case of particles immobilized on electrically conductive carbon blacks.

Numerous oxidic and nonoxidic solids such as $Al_2O_3$, $TiO_2$, $SiO_2$, $CaCO_3$, $MgO$, $La_2O_3$, carbon black or activated carbon can be used as supports for the water-soluble metal oxide colloids for the purpose of preparing heterogeneous catalysts.

The metal, bimetal or multimetal oxide colloids described here are employed as catalysts or precursors of catalysts for organic chemical reactions such as hydrogenations, oxidations or C—C and other coupling reactions. Use as electrocatalysts in fuel cells is likewise possible and is of particular importance in view of the low production costs.

EXAMPLE 1

Figure 1:
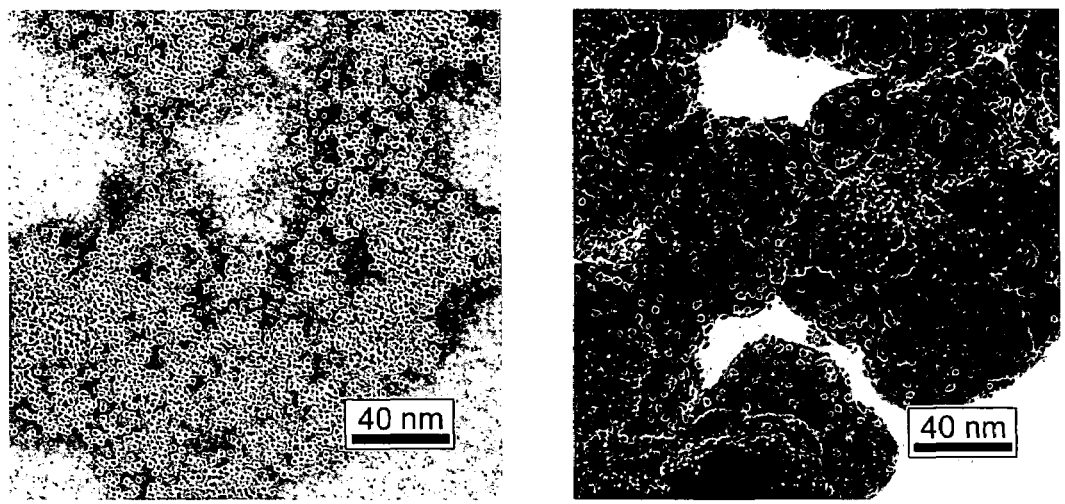
FIG. 1 is a transmission electron micrograph of the $PtRuO_x$ colloid stabilized with hydroxide ions (left), and the supported $PtRuO_x$ catalyst subsequently obtained therefrom (right).

Immobilization of Preformed Hydroxide-Stabilized Platinum Dioxide Colloids 2 ml of a saturated lithium carbonate solution and 6 ml of UHQ water were placed in a 20 ml GC vessel. While stirring, 1 ml of a 0.1 M hexachloroplatinic acid stock solution was added. Finally, the solution was made up to 10 ml with 2 ml of UHQ water and the vessel was closed. The solution was stirred at 60° C. for 10 hours. The progress of the hydrolysis and condensation was followed UV-spectroscopically by means of the decrease in the $H_2PtCl_6$ absorption at 260 nm until the UV spectrum showed no change in the plasmon band. As soon as no further change occurred in the spectrum, a sample was taken for TEM. 78 mg of Vulcan XC72 carbon black were subsequently added in order to immobilize the resulting platinum dioxide colloids stabilized by hydroxide ions. After 20 hours, immobilization on the support was complete. The suspension was worked up by sedimenting it in a centrifuge at 5000 rpm for 10 minutes. The solid was washed three times with acetone/water (1/1) and centrifuged.

| Yield: | 85.5 mg |
| --- | --- |
| SEM/EDX: | 8.27% by weight of Pt |
| TEM (colloid): | 2.0 ± 0.5 nm |
| TEM (catalyst): | 1–2 nm |

EXAMPLE 2

Immobilization of Preformed Hydroxide-Stabilized Platinum-Ruthenium Oxide Colloids 4 ml of a saturated lithium carbonate solution and 4 ml of UHQ water were placed in a 20 ml GC vessel. Firstly 0.05 mmol of hexachloroplatinic acid dissolved in 1 ml of UHQ water and subsequently 0.05 mmol of ruthenium trichloride dissolved in 1 ml of water were added thereto. The solution then had a pH of about 9-10. The GC vessel was closed by means of a septum and the metal salt solution was stirred at 60° C. for 10 hours. The progress of the reaction was followed by UV spectroscopy by means of the decrease in the $H_2PtCl_6$ absorption at 260 nm until the UV spectrum showed no change in the plasmon band. As soon as no further change occurred in the spectrum, a sample was taken for TEM (FIG. 1: TEM at left). 78 mg of Vulcan XC72 conductive carbon black were subsequently added and the mixture was stirred at 60° C. for a further 12 hours. The suspension was worked up by sedimenting it in a centrifuge at 5000 rpm for 10 minutes. The solid (FIG. 1: TEM at right) was washed three times with acetone/water=1/1 and centrifuged.

| Yield: | 38.1 mg |
| --- | --- |
| SEM/EDX: | 2.58% by weight of Pt; 1.97% by weight of Ru |
| TEM ($PtRuO_x$ colloid): | 1.4 ± 0.3 nm |
| TEM ($PtRuO_x$ catalyst): | 1.8 ± 0.4 nm |

General Procedures for the Preparation of the Supported Catalysts

GP1 Cleaning of the Glass Apparatus Used

The glass flasks used were freed of any traces of metal by means of aqua regia before use. To remove any ground joint grease residues, the flasks were subsequently cleaned out using a scourer under hot water and for the same purpose rinsed with methyl tert-butyl ether.

GP2 Instant Process

In a two-neck flask which had been cleaned as described in GP1 or a 20 ml GC vessel, 3 equivalents of lithium carbonate were dissolved in ⅗ of the volume of UHQ water necessary for a 10 mM batch. The amount of carbon black necessary for 20% by weight loading was added to the solution. The desired amount of noble metal salt dissolved in ⅕ of the volume of UHQ water was added dropwise to this suspension. The remaining amount was used to transfer the residue of the metal salt into the reaction vessel, so that a 10 mM solution, based on the total noble metal content, was obtained. The pH of the suspension should have been in the range from 9 to 10. The suspension was stirred at 60° C. The progress of the reaction was followed by means of UV spectroscopy. The samples were firstly centrifuged at 14 000 rpm. At the beginning, the supernatant was diluted 1/100 and the 0.1 mM solution was measured. As soon as no absorption or an unchanged absorption in the UV spectrum was observed, the reaction was complete. The suspension was centrifuged and the solid was washed three times with water/methanol (1/1) and centrifuged again. Finally, the laden carbon black was dried by means of freeze drying.

EXAMPLE 3

In-Situ Immobilization of Hydroxide-Stabilized Metal Oxide Colloids

Procedure: as Described in GP2

TABLE 1

Platinum dioxide/Vulcan catalysts prepared

| Cat. | V [ml] | Platinum [mmol] | $Li_2CO_3$ [mmol] | Carbon black [mg] | t [h] | Yield [mg] | $w_{metal}$ [% by weight] | $d_{TEM}$ [nm] |
| --- | --- | --- | --- | --- | --- | --- | --- | --- |
| EC13 | 50 | 0.5 | 1.5 | 400 | 6 | 387.0 | 13.17 | 1.2 ± 0.3 |
| EC14 | 100 | 0.9 | 3.0 | 800 | 10 | 945.0 | 15.12 | 1.6 ± 0.4 |
| EC15 | 100 | 1.1 | 3.0 | 800 | 22 | 1035.0 | 17.57 | 1.3 ± 0.3 |

EXAMPLE 4

Double Direct Application of Platinum to Vulcan XC72 Carbon Black Support EC23

In a 50 ml two-necked flask which had been cleaned as described in GP1, 20 mg of the catalyst EC15 (17.57% by weight of platinum, 3.6 mg of Pt) were suspended in 18 ml of UHQ water. 1 ml of a saturated lithium carbonate solution was added thereto. Finally, 4.0 mg of platinum as hexachloroplatinic acid (9.3 mg of 43% by weight Pt in $H_2PtCl_6$ according to EA) dissolved in 1 ml of UHQ water were added. The suspension then had a pH of 10.3. The suspension was then stirred at 60° C. for 24 hours. The reaction solution was purified by means of two dialyses against 200 ml of water and finally freeze dried.

| Yield: | 20.3 mg |
| --- | --- |
| SEM/EDX: | 32.4% by weight of platinum |
| TEM (EC23): | 1.4 ± 0.3 nm |

EXAMPLE 5

Application of the Platinum Dioxide Colloids to Various Carbon Black Supports

Preparation as Described in GP2

TABLE 2

Immobilization of platinum dioxide colloids on various conductive carbon blacks

| Cat. | Support | Target loading | Weight of carbon black used [mg] | $w_{Pt}$ [% by weight] | $d_{TEM}$ [nm] |
|---|---|---|---|---|---|
| EC24 | EB111 carbon black | 20% by weight | 78.0 | 14.09 | 1.4 ± 0.3 |
| EC25 | EB111 carbon black | 30% by weight | 45.5 | 15.06 | 1.6 ± 0.4 |
| EC26 | N220 carbon black | 20% by weight | 78.0 | 17.59 | 1.8 ± 0.4 |
| EC27 | EB171 carbon black | 20% by weight | 78.0 | 18.69 | 1.6 ± 0.4 |
| EC28 | N234 carbon black | 20% by weight | 78.0 | 18.98 | 1.6 ± 0.3 |
| EC29 | N234graph carbon black | 20% by weight | 78.0 | 21.71 | 1.7 ± 0.3 |
| EC30 | Printex XE2 carbon black | 20% by weight | 78.0 | 17.78 | 1.3 ± 0.3 |

EXAMPLE 6

Bimetallic, Trimetallic and Tetrametallic Systems by the Instant Method

Procedure: as Described in GP11

TABLE 3

Bimetallic, trimetallic and tetrametallic metal oxide/Vulcan catalysts prepared

| Cat. | V [ml] | Metal [mmol] | $Li_2CO_3$ [mmol] | Vulcan carbon black [mg] | Yield [mg] | $w_{metal}$ [% by weight] | $d_{TEM}$ [nm] |
|---|---|---|---|---|---|---|---|
| EC31 | 20 | 0.10 Pt<br>0.10 Ru | 0.6 | 119 | 81.0 | 8.15 Pt<br>5.08 Ru | 1.3 ± 0.3 |
| EC32 | 50 | 0.25 Pt<br>0.15 Ir | 1.5 | 296 | 358.0 | 11.29 Pt<br>6.56 Ir | 1.6 ± 0.4 |
| EC33 | 20 | 0.10 Pt<br>0.10 Os | 0.6 | 15 | 118.0 | 6.19 Pt<br>6.89 Os | 1.2 ± 0.3 |
| EC34 | 100 | 0.68 Pt<br>0.34 Ru<br>0.34 Mo | 1.5 | 800 | 824.0 | 13.22 Pt<br>3.84 Ru<br>1.92 Mo | 1.6 ± 0.5 |
| EC35 | 30 | 0.07 Pt<br>0.07 Ru<br>0.07 Os | 0.6 | 130 | 138.0 | 4.07 Pt<br>1.91 Ru<br>0.33 Os | 1.3 ± 0.3 |
| EC42 | 60 | 0.15 Pt<br>0.06 Ru<br>0.02 Os | 0.7 | 160 | 229.0 | 18.90 Pt<br>5.57 Ru<br>1.62 Os | 1-2 |
| EC41 | 60 | 0.11 Pt<br>0.10 Ru<br>0.03 Os<br>0.01 Ir | 0.8 | 160 | 213.0 | 13.38 Pt<br>9.14 Ru<br>1.45 Os<br>1.02 Ir | 1-2 |
| EC43 | 30 | 0.06 Pt<br>0.06 Sn | 0.2 | 80 | 57.0 | 6.29 Pt<br>2.02 Sn | 1-2 |

EXAMPLE 7

Reduction of the Directly Supported Platinum Dioxide Colloids

As Suspension

In a 100 ml nitrogen flask, 50 mg of the catalyst EC14 were suspended in 20 ml of UHQ water. The flask was evacuated and flushed with argon three times. It was subsequently evacuated and filled with hydrogen three more times. The suspension was then stirred for 24 hours under a hydrogen atmosphere. After the reduction was complete, the water was removed by means of freeze-drying.

TEM (EC14red): 2.3±0.6 nm

Dry Reduction 50 mg of the catalyst EC15 were placed in a baked Schlenk flask filled with argon. The vessel was closed and evacuated and filled with argon three times. It was subsequently evacuated and filled with hydrogen three more times. The catalyst was left in the hydrogen atmosphere for 24 hours. The flask was then flushed with argon again and the catalyst was analyzed by means of TEM.

TEM (EC14red): 2.4±0.7 nm

The invention claimed is:

1. A process for preparing catalysts comprising monometal oxide particles or multimetal oxide particles, said particles having particle diameters of from 1 to 3 nm and being immobilized on a support, said process comprising the steps of:
   a) hydrolyzing and condensing or cocondensing in a basic aqueous solution a metal salt or a mixture of a plurality of metal salts to yield a solution comprising water-soluble monometal oxide or multimetal oxide colloid stabilized by hydroxide ions, wherein the metal(s) of said metal salt or said plurality of metal salts is(are) selected from the group consisting of metals of transition groups IIIb, IVb, Vb, VIb, VIIb, VIII, Ib or IIb of the Periodic Table of Elements, and
   b) immobilizing the resulting water-soluble monometal oxide or multimetal oxide colloid stabilized by hydroxide ions in situ on a support which is additionally present in suspension in the solution.

2. The process as claimed in claim 1, wherein the salt of a main group metal is additionally used as metal salt.

3. The process as claimed in claim 2, wherein the main group metal is tin.

4. The process as claimed in claim 3, wherein the metal salt is $SnCl_2$ or $SnCl_4$.

5. The process as claimed in claim 1, wherein the support is selected from the group consisting of oxidic supports.

6. The process as claimed in claim 5, wherein $Al_2O_3$, $TiO_2$, $SiO_2$, $Co_3O_4$, $SnO_2$, $CaCO_3$, MgO or $La_2O_3$ are used as oxidic supports.

7. The process as claimed in claim 1, wherein the support is selected from the group consisting of nonoxidic supports in the form of carbon black or activated carbon.

8. The process as claimed in claim 1, wherein the basic aqueous solution comprises a base selected from the group consisting of a carbonate, hydrogen carbonate, hydroxide, phosphate or hydrogen phosphate of an alkali metal or alkaline earth metal.

9. The process as claimed in claim 8, wherein $Li_2CO_3$, $Na_2CO_3$; $K_2CO_3$, $Cs_2CO_3$ or $MgCO_3$ is used as base.

10. The process as claimed in claim 1, which is conducted at a reaction temperature in the range from 20 to 100° C.

11. The process as claimed in claim 10, wherein the reaction temperature is in the range from 50 to 90° C.

12. The process as claimed in claim 1, wherein a ratio of the metals in the multimetallic metal oxide particles is controlled via a ratio of the metal salts used.

13. The process as claimed in claim 1, which further comprises reducing the immobilized metal oxide particles.

14. The process as claimed in claim 13, wherein said reducing is carried out by reacting the immobilized metal oxide particles with a reducing agent, and hydrogen, hypophosphite, formate or an alcohol is used as reducing agent.

15. The process as claimed in claim 14, wherein methanol or ethanol is used as alcohol.

16. The process as claimed in claim 13, wherein electrically conductive carbon black is used as support and the metal oxide particles are reduced electrochemically.

17. A supported catalyst comprising metal oxide particles which are prepared by a process as claimed in claim 1.

18. A supported catalyst comprising metal oxide particles, wherein the metal oxide particles have particle diameters of from 1 to 3 nanometers and are immobilized on supports, wherein the particles comprise oxides:
   a) of at least three metals of which one metal can be a main group metal and the other metals are metals of transition groups IIIb, IVb, Vb, VIb, VIIb, VIII, Ib or IIb of the PTE, or
   b) of two metals of which:
   i) one metal is Pt and the other metal is Sn or Ir, Ru, Fe or W or another metal of transition groups IIIb, IVb, Vb, VIb, VIIb, VIII, Ib or IIb of the PTE, or ii) one metal is Ir and the other metal is a metal of transition groups IIIb, IVb, Vb, VIb, VIIb, VIII, Ib or IIb of the PTE.

19. The supported catalyst as claimed in claim 18, comprising oxides of at least three metals, wherein oxides of Pt and Ir and of at least one further metal of transition groups IIIb, IVb, Vb, VIb, VIIb, VIII, Ib or IIb of the PTE are present in the metal oxide particles.

20. The supported catalyst as claimed in claim 18, wherein the main group metal is tin.

21. The supported catalyst as claimed in claim 18, comprising the oxides of at least three metals selected from the group consisting of Pt, Ir. Ru, Os, W, Mo, Pd and Sn.

22. The supported catalyst as claimed in claim 18, wherein the supports are nonoxidic supports in the form of carbon black or activated carbon.

23. The supported catalyst as claimed in claim 18, wherein the supports are oxidic supports.

24. The supported catalyst as claimed in claim 23, wherein the supports are $Al_2O_3$, $TiO_2$, $SiO_2$, $CaCO_3$, $MgO$ or $La_2O_3$.

* * * * *